United States Patent
Lee et al.

(10) Patent No.: US 9,322,961 B2
(45) Date of Patent: Apr. 26, 2016

(54) OPTICAL MEMBER, DISPLAY DEVICE INCLUDING THE SAME AND MANUFACTURING METHOD THEREOF

(75) Inventors: Sun Hwa Lee, Seoul (KR); Jeong Taek Oh, Seoul (KR); Gwang Hei Choi, Seoul (KR)

(73) Assignee: LG INNOTEK CO., LTD, Seoul (KR)

( * ) Notice: Subject to any disclaimer, the term of this patent is extended or adjusted under 35 U.S.C. 154(b) by 228 days.

(21) Appl. No.: 14/112,862

(22) PCT Filed: Dec. 20, 2011

(86) PCT No.: PCT/KR2011/009872
§ 371 (c)(1),
(2), (4) Date: Oct. 18, 2013

(87) PCT Pub. No.: WO2012/144720
PCT Pub. Date: Oct. 26, 2012

(65) Prior Publication Data
US 2014/0049826 A1    Feb. 20, 2014

(30) Foreign Application Priority Data

Apr. 21, 2011    (KR) .................. 10-2011-0037543

(51) Int. Cl.
| | |
|---|---|
| *G02B 23/16* | (2006.01) |
| *G02B 5/124* | (2006.01) |
| *G02B 1/10* | (2015.01) |
| *G02F 1/1335* | (2006.01) |
| *F21V 8/00* | (2006.01) |

(52) U.S. Cl.
CPC ............ *G02B 1/105* (2013.01); *G02B 6/005* (2013.01); *G02F 1/133603* (2013.01); *G02F 1/133615* (2013.01); *G02F 2001/133614* (2013.01); *G02F 2201/50* (2013.01); *G02F 2202/108* (2013.01)

(58) Field of Classification Search
CPC .. G02B 6/0073; G02B 6/0088; G02B 6/0091; G02B 6/0053; G02B 6/0093; G02B 6/0095; G02B 6/0096; G02B 1/105; G02B 23/16; G02F 1/1336; G02F 1/133308; G02F 2001/13332; F21V 15/01; F21K 9/50
USPC ............. 359/513, 514; 349/65; 362/602, 606, 362/607, 608, 611, 612, 632, 633, 634
See application file for complete search history.

(56) References Cited

U.S. PATENT DOCUMENTS

| | | |
|---|---|---|
| 2006/0033032 A1 | 2/2006 | Inoue et al. |
| 2006/0038194 A1 | 2/2006 | Terashima et al. |
| 2006/0268537 A1 | 11/2006 | Kurihara et al. |
| 2007/0296888 A1 | 12/2007 | Kim et al. |
| 2008/0044773 A1 | 2/2008 | Kawamura |

(Continued)

FOREIGN PATENT DOCUMENTS

| | | |
|---|---|---|
| GB | 2 344 346 A | 6/2000 |
| JP | 2000-111721 A | 4/2000 |

(Continued)

*Primary Examiner* — Jade R Chwasz
(74) *Attorney, Agent, or Firm* — Birch, Stewart, Kolasch & Birch, LLP

(57) ABSTRACT

Disclosed are an optical member, a display device including the same and a method of manufacturing the same. The optical member includes a wavelength conversion layer; and a capping part covering lateral sides of the wavelength conversion layer. The capping part includes an organic substance and an inorganic substance to improve the sealing function of the wavelength conversion layer.

20 Claims, 7 Drawing Sheets

(56) References Cited

U.S. PATENT DOCUMENTS

| | | | |
|---|---|---|---|
| 2009/0091258 A1* | 4/2009 | Heuser | H01L 33/50 313/512 |
| 2010/0238381 A1 | 9/2010 | Oshima et al. | |
| 2011/0002140 A1 | 1/2011 | Tsukahara et al. | |
| 2011/0037926 A1 | 2/2011 | Tsukahara et al. | |
| 2014/0022819 A1 | 1/2014 | Oh et al. | |

FOREIGN PATENT DOCUMENTS

| | | |
|---|---|---|
| JP | 2009-76911 A | 4/2009 |
| JP | 2010-256373 A | 11/2010 |
| KR | 10-2005-0100602 A | 10/2005 |
| KR | 10-2006-0125535 A | 12/2006 |
| TW | 200822357 A | 5/2008 |
| TW | 200822794 A | 5/2008 |
| TW | 201188699 Y | 1/2009 |
| TW | 200952547 A | 12/2009 |
| TW | 201040588 A | 11/2010 |
| TW | 201105767 A | 2/2011 |
| WO | WO 2012/138038 A1 | 10/2012 |

\* cited by examiner

OPTICAL MEMBER, DISPLAY DEVICE INCLUDING THE SAME AND MANUFACTURING METHOD THEREOF

TECHNICAL FIELD

The disclosure relates to an optical member, a display device including the same and a manufacturing method thereof.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device capable of displaying various images using the white light supplied to the light guide plate through the quantum dot bar as the blue light is emitted from the blue LED has been extensively used.

DISCLOSURE OF INVENTION

Technical Problem

The embodiment provides an optical member having improved durability and reliability, a display device including the same and a manufacturing method thereof.

Solution to Problem

An optical member according to the embodiment includes a wavelength conversion layer; and a capping part covering lateral sides of the wavelength conversion layer.

An optical member according to the embodiment includes a wavelength conversion layer; and a capping part covering at least one side of the wavelength conversion layer, wherein the capping part includes an organic substance and an inorganic substance.

A display device according to the embodiment includes the optical member.

A method for manufacturing an optical member according to the embodiment includes the steps of forming a wavelength conversion layer; and forming a capping part by simultaneously depositing an organic substance and an inorganic substance on at least one side of the wavelength conversion layer.

Advantageous Effects of Invention

The optical member according to the embodiment includes the capping part capable of covering the lateral sides of the wavelength conversion layer. The capping part can prevent oxygen and/or moisture from penetrating into the lateral sides of the wavelength conversion layer.

Therefore, the optical member according to the embodiment may have improved oxygen-resistance and moisture-resistance properties.

In addition, the capping part includes the organic substance and the inorganic substance. Therefore, the capping part can effectively protect the wavelength conversion layer from external chemical impact.

Thus, the optical member according to the embodiment can effectively protect wavelength conversion particles included in the wavelength conversion layer while representing improved durability and reliability.

MODE FOR THE INVENTION

Figure 1:
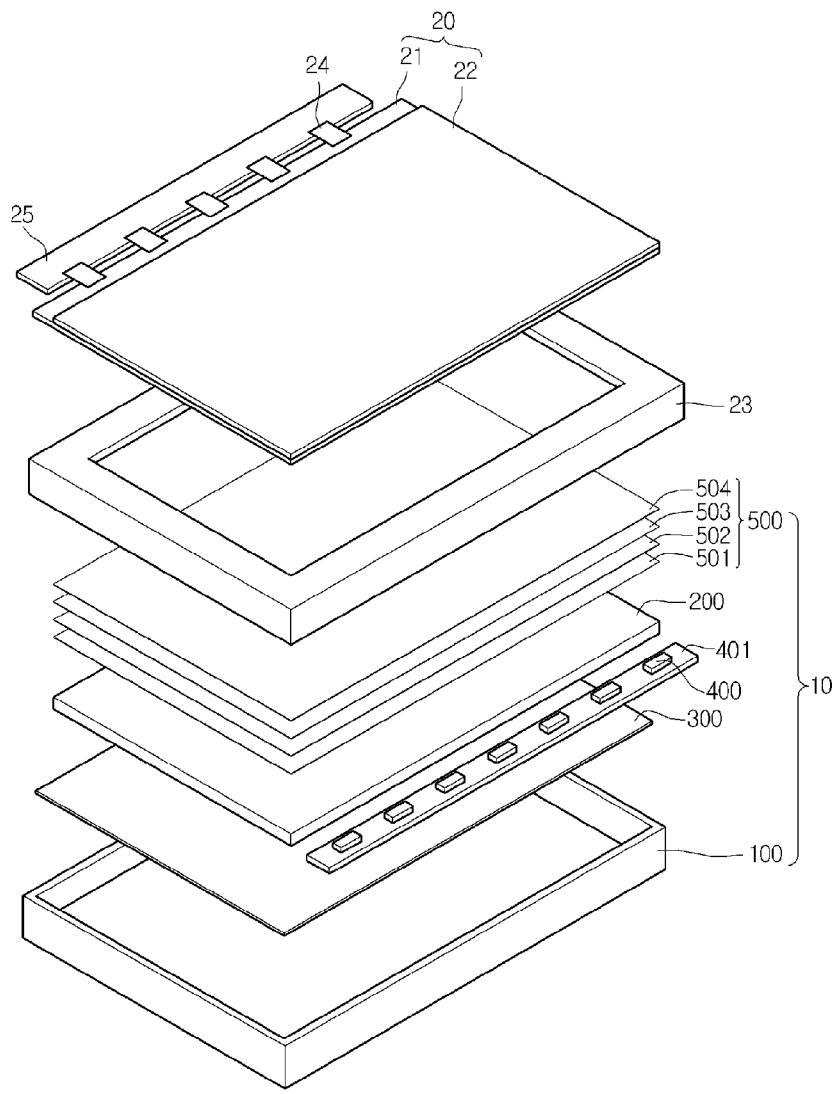
FIG. 1 is an exploded perspective view showing an LCD according to the first embodiment.

In the description of the embodiments, it will be understood that when a layer (or film), a region, a pattern, or a structure is referred to as being on or under another substrate, another layer (or film), another region, another pad, or another pattern, it can be directly or indirectly on the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
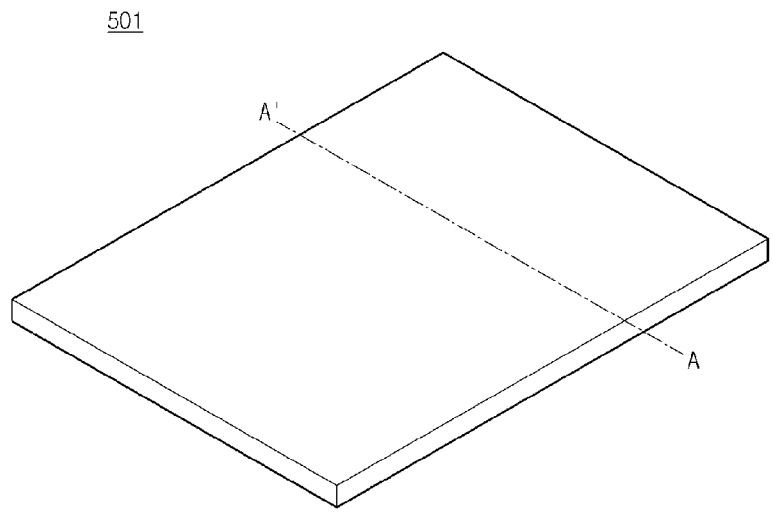
FIG. 2 is a perspective view of a wavelength conversion sheet.
Figure 3:
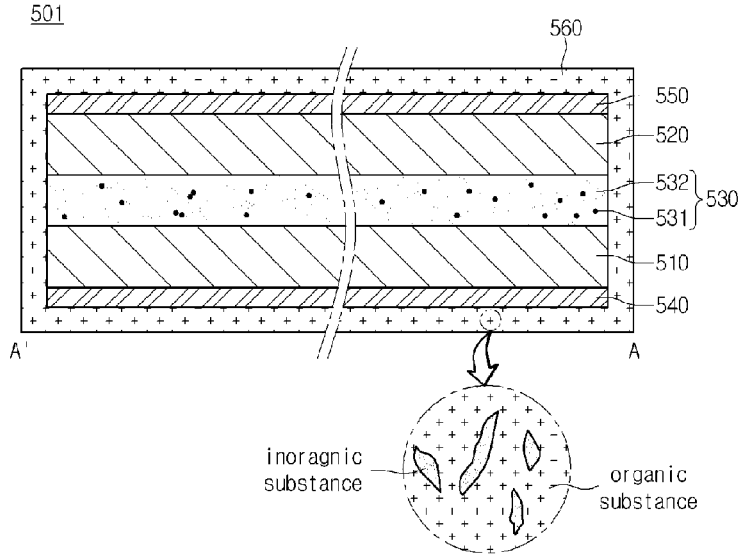
FIG. 3 is a sectional view taken along line A-A' of FIG. 2.

FIG. 1 is an exploded perspective view showing an LCD according to the first embodiment, FIG. 2 is a perspective view of a wavelength conversion sheet, FIG. 3 is a sectional view taken along line A-A' of FIG. 2, FIGS. 4 to 6 are views showing the procedure for manufacturing a wavelength conversion sheet, and FIGS. 7 to 10 are sectional views showing modified examples of a wavelength conversion sheet.

Referring to FIGS. 1 to 10, the LCD according to the embodiment includes a backlight unit 10 and a liquid crystal panel 20.

The backlight unit 10 supplies light to the liquid crystal panel 20. The backlight unit 10 serves as a surface light source so that the light can be uniformly supplied to a bottom surface of the liquid crystal panel 20.

The backlight unit 10 is disposed below the liquid crystal panel 20. The backlight unit 10 includes a bottom cover 100, a light guide plate 200, a reflective sheet 300, a plurality of light emitting diodes 400, a printed circuit board 401, and a plurality of optical sheets 500.

The upper portion of the bottom cover 100 is open. The bottom cover 100 receives the light guide plate 200, the light emitting diodes 400, the printed circuit board 401, the reflective sheet 300, and the optical sheets 500 therein.

The light guide plate 200 is disposed in the bottom cover 100 and arranged on the reflective sheet 300. The light guide plate 200 guides the light upward by totally reflecting, refracting and scattering the light incident thereto from the light emitting diodes 400.

The reflective sheet 300 is disposed under the light guide plate 200. In more detail, the reflective sheet 300 is disposed between the light guide plate 200 and the bottom surface of the bottom cover 100. The reflective sheet 300 reflects the light upward as the light is output downward from the bottom surface of the light guide plate 200.

The light emitting diodes 400 serve as a light source for generating the light. The light emitting diodes 400 are disposed at one lateral side of the light guide plate 200. The light generated from the light emitting diodes 400 is incident into the light guide plate 200 through the lateral side of the light guide plate 200.

The light emitting diodes 400 may include a blue light emitting diode generating the blue light or a UV light emitting diode generating the UV light. In detail, the light emitting diodes 400 can emit the blue light having the wavelength band of about 430 nm to 470 nm or the UV light having the wavelength band of about 300 nm to 400 nm.

The light emitting diodes 400 are mounted on the printed circuit board 401. The light emitting diodes 400 can be disposed under the printed circuit board 401. The light emitting diodes 400 are driven by receiving a driving signal through the printed circuit board 401.

The printed circuit board 401 is electrically connected to the light emitting diodes 400. The printed circuit board 401 can mount the light emitting diodes 400 thereon. The printed circuit board 401 is disposed in the bottom cover 100.

The optical sheets 500 are disposed on the light guide plate 200. The optical sheets 500 supplies the light to the liquid crystal panel 20 by changing or enhancing the optical property of the light output from the top surface of the light guide plate 200.

The optical sheets 500 include a wavelength conversion sheet 501, a diffusion sheet 502, a first prism sheet 503 and a second prism sheet 504.

The wavelength conversion sheet 501 is disposed on the light guide plate 200. In more detail, the wavelength conversion sheet 501 is interposed between the light guide plate 200 and the diffusion sheet 502. The wavelength conversion sheet 501 guides the light upward by changing the wavelength of the incident light.

For instance, if the light emitting diodes 400 are blue light emitting diodes, the wavelength conversion sheet 501 converts the blue light output upward from the light guide plate 200 into the green light and the red light. In detail, the wavelength conversion sheet 501 converts a part of the blue light into the green light having the wavelength in the range of about 520 nm to about 560 nm, and a part of the blue light into the red light having the wavelength in the range of about 630 nm to about 660 nm.

In addition, if the light emitting diodes 400 are UV light emitting diodes, the wavelength conversion sheet 501 converts the UV light output from the top surface of the light guide plate 200 into the blue light, the green light and the red light. In detail, the wavelength conversion sheet 501 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion sheet 501 without being converted and the lights converted by the wavelength conversion sheet 501. In detail, the white light can be incident into the liquid crystal panel 20 through the combination of the blue light, the green light and the red right.

The wavelength conversion sheet 501 is a wavelength conversion member capable of converting the wavelength of the incident light. That is, the wavelength conversion sheet 501 is an optical member capable of converting the characteristic of the incident light.

As shown in FIGS. 2 and 3, the wavelength conversion sheet 501 includes a lower substrate 510, an upper substrate 520, a wavelength conversion layer 530, a first inorganic protective layer 540, a second inorganic protective layer 550, and a capping part 560.

The lower substrate 510 is disposed under the wavelength conversion layer 530. The lower substrate 510 may be transparent and flexible. The lower substrate 510 adheres to the bottom surface of the wavelength conversion layer 530.

The lower substrate 510 may include transparent polymer, such as polyethyleneterephthalate (PET).

The upper substrate 520 is disposed on the wavelength conversion layer 530. The upper substrate 520 may be transparent and flexible. The upper substrate 520 adheres to the top surface of the wavelength conversion layer 530.

The upper substrate 520 may include transparent polymer, such as polyethyleneterephthalate (PET).

The wavelength conversion layer 530 is sandwiched between the upper and lower substrates 520 and 510. The upper and lower substrates 520 and 510 support the wavelength conversion layer 530. The upper and lower substrates 520 and 510 protect the wavelength conversion layer 530 from external physical impact.

In addition, the upper and lower substrates 520 and 510 have low oxygen and moisture permeability. Thus, the upper and lower substrates 520 and 510 can protect the wavelength conversion layer 530 from external chemical penetration, such as oxygen and/or moisture.

The wavelength conversion layer 530 is interposed between the upper and lower substrates 520 and 510. The wavelength conversion layer 530 adheres to the top surface of the lower substrate 510 and the bottom surface of the upper substrate 520.

The wavelength conversion layer 530 includes a plurality of wavelength conversion particles 531 and a host layer 532.

The wavelength conversion particles 531 are disposed between the upper and lower substrates 520 and 510. In more detail, the wavelength conversion particles 531 are uniformly distributed in the host layer 532 disposed between the upper and lower substrates 520 and 510.

The wavelength conversion particles 531 convert the wavelength of the light emitted from the light emitting diodes 400. In detail, the light is incident into the wavelength conversion particles 531 from the light emitting diodes 400 and the wavelength conversion particles 531 convert the wavelength of the incident light. For instance, the wavelength conversion particles 531 can convert the blue light emitted from the light emitting diodes 400 into the green light and the red light. That is, a part of the wavelength conversion particles 531 converts the blue light into the green light having the wavelength in the range of about 520 nm to about 560 nm and a part of the wavelength conversion particles 531 converts the blue light into the red light having the wavelength in the range of about 630 nm to about 660 nm.

In addition, the wavelength conversion particles 531 can convert the UV light emitted from the light emitting diodes 400 into the blue light, the green light and the red light. That is, a part of the wavelength conversion particles 531 converts the UV light into the blue light having the wavelength in the range of about 430 nm to about 470 nm, and a part of the wavelength conversion particles 531 converts the UV light into the green light having the wavelength in the range of about 520 nm to about 560 nm. Further, a part of the wavelength conversion particles 531 converts the UV light into the red light having the wavelength in the range of about 630 nm to about 660 nm.

In other words, if the light emitting diodes 400 are blue light emitting diodes that emit the blue light, the wavelength conversion particles 531 capable of converting the blue light into the green light and the red light may be employed. In addition, if the light emitting diodes 400 are UV light emitting diodes that emit the UV light, the wavelength conversion particles 531 capable of converting the UV light into the blue light, the green light and the red light may be employed.

The wavelength conversion particles 531 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent.

The host layer 532 surrounds the wavelength conversion particles 531. In detail, the wavelength conversion particles 531 are uniformly distributed in the host layer 352. The host layer 532 includes polymer. The host layer 532 is transparent. That is, the host layer 532 includes transparent polymer.

The host layer 532 is interposed between the lower substrate 510 and the upper substrate 520. In detail, the host layer 532 adheres to the top surface of the lower substrate 510 and the bottom surface of the upper substrate 520.

The first inorganic protective layer 540 is disposed below the wavelength conversion layer 530. In detail, the first inorganic protective layer 540 is disposed under the lower substrate 510. In more detail, the first inorganic protective layer 540 is coated on the bottom surface of the lower substrate 510.

The first inorganic protective layer 540 protects the wavelength conversion layer 530 in association with the lower substrate 510. In detail, the first inorganic protective layer 540 protects the wavelength conversion layer 530 from external physical impact. In addition, the first inorganic protective layer 540 prevents oxygen and/or moisture from penetrating into the wavelength conversion layer 530.

The first inorganic protective layer 540 has the refractive index lower than that of the lower substrate 510. For instance, the first inorganic protective layer 540 has the refractive index in the range of 1.3 to 1.6.

Therefore, the first inorganic protective layer 540 performs the optical damping function between the lower substrate 510 and the capping part 560 and reduces the reflection at the bottom surface of the lower substrate 510.

For instance, the first inorganic protective layer 540 may include silicon oxide or silicon nitride.

The second inorganic protective layer 550 is disposed on the wavelength conversion layer 530. In detail, the second inorganic protective layer 550 is disposed on the upper substrate 520. In more detail, the second inorganic protective layer 550 is coated on the top surface of the upper substrate 520.

The second inorganic protective layer 550 protects the wavelength conversion layer 530 in association with the upper substrate 520. In detail, the second inorganic protective layer 550 protects the wavelength conversion layer 530 from external physical impact. In addition, the second inorganic protective layer 550 prevents oxygen and/or moisture from penetrating into the wavelength conversion layer 530.

The second inorganic protective layer 550 has the refractive index lower than that of the upper substrate 520. For instance, the second inorganic protective layer 550 has the refractive index in the range of 1.3 to 1.6.

Therefore, the second inorganic protective layer 550 performs the optical damping function between the upper substrate 520 and the capping part 560 and reduces the reflection at the top surface of the upper substrate 520.

For instance, the second inorganic protective layer 550 may include silicon oxide or silicon nitride.

The first and second inorganic protective layers 540 and 550 may perform the optical function, such as the anti-reflection function, and seal the wavelength conversion layer 530 to protect the wavelength conversion layer 530 from external physical and chemical impact.

The capping part 560 is disposed at lateral sides of the wavelength conversion layer 530. The capping part 560 covers the lateral sides of the wavelength conversion layer 530. The capping part 560 directly makes contact with the lateral sides of the wavelength conversion layer 530.

In addition, the capping part 560 covers the lateral sides of the lower substrate 510, the lateral sides of the upper substrate 520, the lateral sides of the first inorganic protective layer 540 and the lateral sides of the second inorganic protective layer 550. In more detail, the capping part 560 directly makes contact with the lateral sides of the lower substrate 510, the lateral sides of the upper substrate 520, the lateral sides of the first inorganic protective layer 540 and the lateral sides of the second inorganic protective layer 550.

The capping part 560 covers the top and bottom surfaces of the wavelength conversion layer 530. In detail, the capping part 560 covers the bottom surface of the first inorganic protective layer 540 and the top surface of the second inorganic protective layer 550. In more detail, the capping part 560 is directly coated on the bottom surface of the first inorganic protective layer 540 and the top surface of the second inorganic protective layer 550.

As a result, the capping part 560 is coated on the whole surface of the stack structure including the wavelength conversion layer 530, the lower substrate 510, the upper substrate 520, the first inorganic protective layer 540 and the second inorganic protective layer 550.

The capping part 560 includes an organic substance and an inorganic substance. For instance, the capping part 560 can be prepared as a single layer including the organic substance and the inorganic substance.

The capping part 560 may include the mixture of the organic substance and the inorganic substance. For instance, the capping part 560 mainly includes an organic substance and the inorganic substance is uniformly distributed or doped in the organic substance.

For example, as shown in FIG. 3, the inorganic substance fills fine pores formed in the organic substance. That is, if the organic substance is polymer, fine pores may be formed among polymer molecules. The inorganic substance is filled in the fine pores.

The inorganic substance may include one selected from the group consisting of $Si_XO_Y$, $Si_XN_Y$, $Si_XO_YN_Z$, $Si_XO_YC_Z$, aluminum oxide or $Nb_5O_3$.

The organic substance may include polymer. The organic substance may include parylene resin, such as poly(para-xylene). For instance, the parylene resin can be expressed as flowing chemical formula 1.

Chemical formula 1

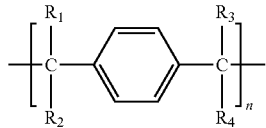

In chemical formula 1, R1, R2, R3 and R4 can be selected from the group consisting of hydrogen, alkyl group, aryl group, hetero aryl group and alkoxy group, respectively.

In more detail, the organic substance is poly(para-xylene) and the inorganic substance is silicon oxide.

In addition, the capping part 560 may include an organic-inorganic composite. In detail, the organic-inorganic composite can be prepared by bonding the inorganic substance in the form of molecules to the organic substance.

If the organic substance is poly(para-xylene) and the inorganic substance is silicon oxide, the silicon oxide in the form of molecules can be bonded to the poly(para-xylene). That is, the capping part 560 may include silicon oxide-poly(para-xylene) composite expressed as follows.

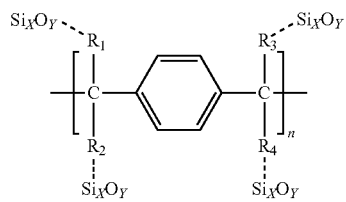

In the above chemical formula, R1, R2, R3 and R4 can be selected from the group consisting of hydrogen, alkyl group, aryl group, hetero aryl group and alkoxy group, respectively.

Since the capping part 560 includes the organic-inorganic composite, the bonding strength between the inorganic substance and the organic substance can be enhanced. That is, the organic-inorganic composite is formed between the organic substance and the inorganic substance to enhance the bonding strength between the inorganic substance and the organic substance.

In addition, the capping part 560 may further include a product, which is produced through the chemical bonding between the inorganic substance and the organic substance. For instance, the capping part 560 may further include silicon-substituted polymer.

In detail, if the organic substance is poly(para-xylene) and the inorganic substance is silicon oxide, the silicon oxide reacts with the poly(para-xylene), so the capping part 560 may include silicon-substituted poly(para-xylene) as expressed by chemical formula 2.

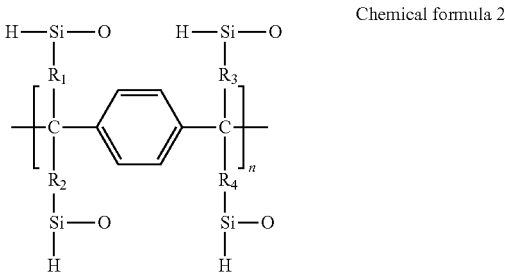

Chemical formula 2

In above chemical formula 2, R1, R2, R3 and R4 can be selected from the group consisting of hydrogen, alkyl group, aryl group, hetero aryl group and alkoxy group, respectively.

In this manner, since the capping part 560 includes the organic substance and the inorganic substance, the capping part 560 may have a close-pack structure. Thus, the capping part 560 can effectively protect the wavelength conversion particles from oxygen and/or moisture.

The capping part 560 may have a thickness in the range of about 0.1 μm to about 100 μm.

The capping part 560 protects the wavelength conversion layer 530 from the physical and/or chemical impact. In detail, the capping part 560 can prevent moisture and/or oxygen from penetrating into the top surface, the bottom surface, and the lateral sides of the wavelength conversion layer 530.

Accordingly, the capping part 560 can prevent the wavelength conversion particles 531 from being degenerated by the moisture and/or oxygen while improving the reliability and durability of the wavelength conversion sheet 501.

Figure 4:
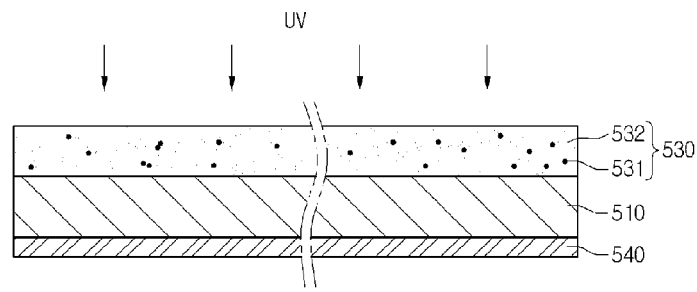
FIGS. 4 to 6 are views showing the procedure for manufacturing a wavelength conversion sheet.
Figure 5:
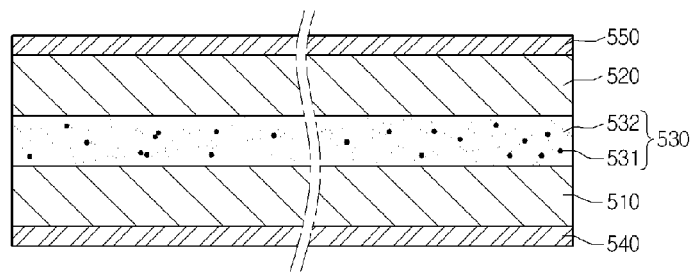
Figure 6:
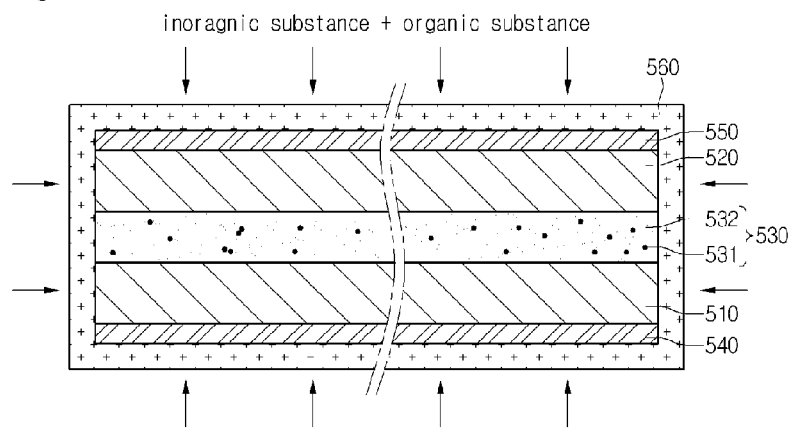

Referring to FIGS. 4 to 6, the wavelength conversion sheet 501 can be formed through the following method.

As shown in FIG. 4, after the first inorganic protective layer 540 has been coated on the bottom surface of the lower substrate 510, a resin composition including a plurality of wavelength conversion particles 531 is coated on the lower substrate 510.

Then, the resin composition is cured by the UV ray, so that the wavelength conversion layer 530 is formed.

Referring to FIG. 5, the upper substrate 520 coated with the second inorganic protective layer 550 is laminated in the wavelength conversion layer 530.

Referring to FIG. 6, the capping part 560 is formed on the outer surface of the stack structure including the lower substrate 510, the upper substrate 520, the wavelength conversion layer 530, the first inorganic protective layer 540 and the second inorganic protective layer 550. In detail, the capping part 560 is formed on the lateral sides of the lower substrate 510, the upper substrate 520, the wavelength conversion layer 530, the first inorganic protective layer 540 and the second inorganic protective layer 550, the bottom surface of the first inorganic protective layer 540 and the top surface of the second inorganic protective layer 550.

The capping part 560 can be formed by simultaneously depositing the organic and inorganic substances on the outer surface of the stack structure including the lower substrate 510, the upper substrate 520, the wavelength conversion layer 530, the first inorganic protective layer 540 and the second inorganic protective layer 550.

The organic and inorganic substances can be deposited through the physical vapor deposition process, the printing process, the spin coating process or the spray coating process.

In addition, the organic and inorganic substances can be deposited through the chemical vapor deposition process.

For instance, the capping part 560 may be formed through the evaporation process. In detail, after the organic and inorganic substances have been evaporated, the evaporated organic and inorganic substances are deposited on the outer surface of the stack structure including the lower substrate 510, the upper substrate 520, the wavelength conversion layer 530, the first inorganic protective layer 540 and the second inorganic protective layer 550, so that the capping part 560 is formed.

For example, the capping part 560 can be formed by simultaneously depositing silicon oxide and parylene polymer through the evaporation process.

Thus, the capping part 560 includes the mixture of the silicon oxide and parylene polymer.

In addition, the silicon oxide-parylene composite may be formed while the silicon oxide and parylene polymer are being deposited. That is, the capping part 560 may include the silicon oxide-parylene composite.

In addition, the silicon oxide may chemically react with the parylene polymer while the silicon oxide and parylene polymer are being deposited. Thus, the silicon-substituted parylene polymer can be formed. That is, the capping part 560 may include the silicon-substituted parylene polymer.

Figure 7:
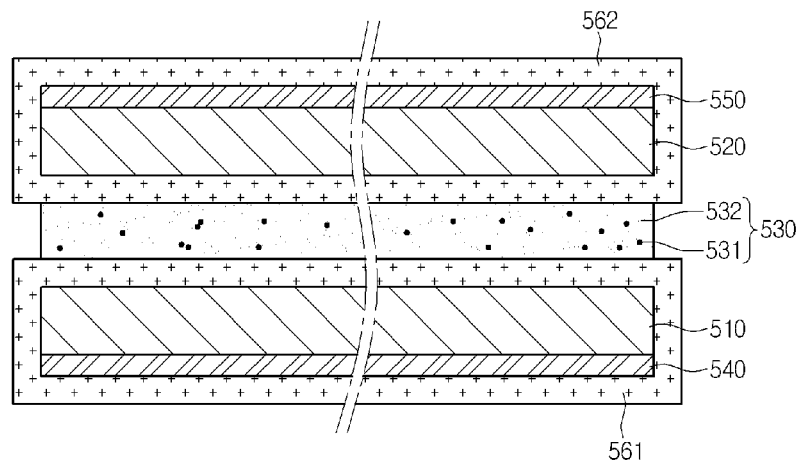
FIGS. 7 to 10 are sectional views showing modified examples of a wavelength conversion sheet.

Referring to FIG. 7, the wavelength conversion sheet 501 includes a first capping part 561 and a second capping part 562. The first capping part 561 may be coated on the top surface and the lateral sides of the lower substrate 510, and the bottom surface and the lateral sides of the first inorganic protective layer 540. In addition, the first capping part 561 is interposed between the wavelength conversion layer 530 and the lower substrate 510.

The second capping part 562 may be coated on the bottom surface and the lateral sides of the upper substrate 520, and the top surface and the lateral sides of the second inorganic protective layer 550. In addition, the second capping part 562 is interposed between the wavelength conversion layer 530 and the upper substrate 520.

The first and second capping parts 561 and 562 can be formed by using a material the same as that of the capping part 560.

Due to the first and second capping parts 561 and 562, the moisture and/or oxygen penetrating into the upper and lower portions of the wavelength conversion layer 530 can be effectively blocked.

Figure 8:
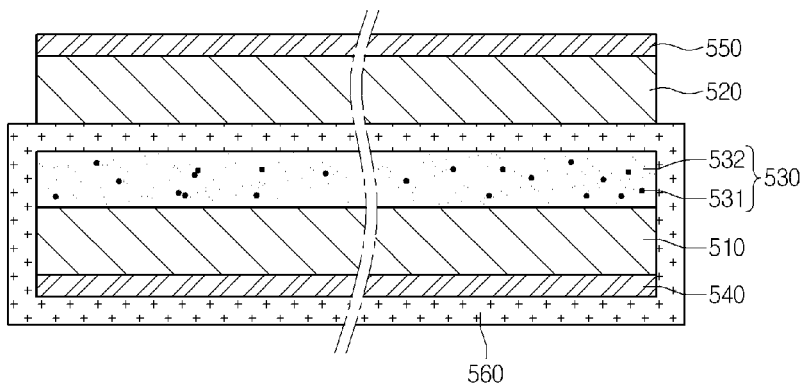

Referring to FIG. 8, the capping part 560 surrounds the lower substrate 510, the wavelength conversion layer 530 and the first inorganic protective layer 540. In detail, the capping part 560 is coated on the lateral sides of the lower substrate 510, the wavelength conversion layer 530 and the first inorganic protective layer 540, the top surface of the wavelength conversion layer 530 and the bottom surface of the first inorganic protective layer 540.

That is, the capping part 560 directly covers the top surface and the lateral sides of the wavelength conversion layer 530.

In detail, the capping part 560 is directly coated on the top surface and the lateral sides of the wavelength conversion layer 530.

In order to form the wavelength conversion sheet 501 shown in FIG. 8, the capping part 560 is formed first and then the upper substrate 520 is laminated on the capping part 560.

Figure 9:
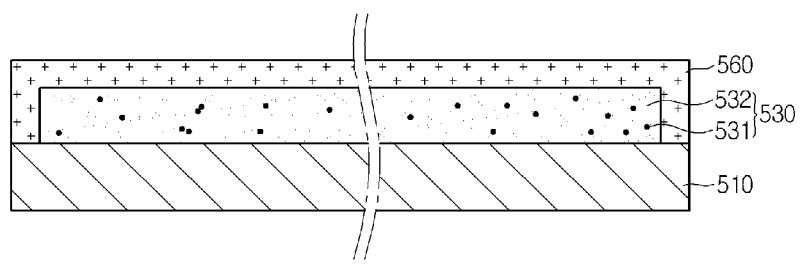

Referring to FIG. 9, the wavelength conversion layer 530 is disposed on the top surface of the lower substrate 510. The wavelength conversion layer 530 exposes a part of the top surface of the lower substrate 510. The exposed top surface of the lower substrate 510 may surround the wavelength conversion layer 530. That is, when viewed from the top, the exposed top surface of the lower substrate 510 has a closed loop shape.

The capping part 560 covers the wavelength conversion layer 530. The capping part 560 directly covers the top surface and the lateral sides of the wavelength conversion layer 530. In detail, the capping part 560 is directly coated on the top surface and the lateral sides of the wavelength conversion layer 530.

In addition, the capping part 560 can directly make contact with the top surface of the lower substrate 510. In detail, the capping part 560 can directly make contact with the exposed top surface of the lower substrate 510.

Figure 10:
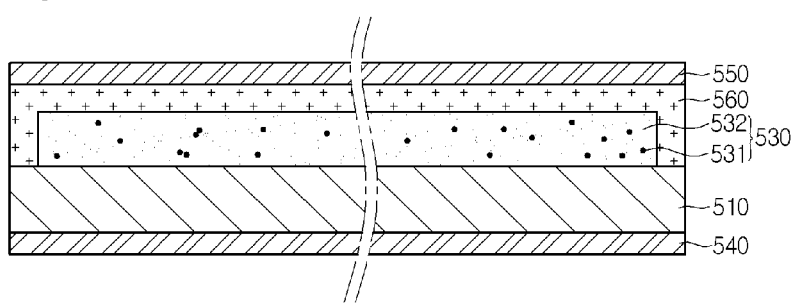

Further, as shown in FIG. 10, the first and second inorganic protective layers 540 and 550 can be added to the wavelength conversion sheet 501 shown in FIG. 9.

In detail, the first inorganic protective layer 540 is disposed on the bottom surface of the lower substrate 510, and the second inorganic protective layer 550 is formed on the capping part 560. The first inorganic protective layer 540 is directly deposited on the bottom surface of the lower substrate 510, and the second inorganic protective layer 550 can be directly deposited on the top surface of the capping part 560.

Referring again to FIG. 1, the diffusion sheet 502 is disposed on the wavelength conversion sheet 501 to improve uniformity of light passing through the diffusion sheet 502. The diffusion sheet 502 may include a plurality of beads.

The first prism sheet 503 is disposed on the diffusion sheet 502. The second prism sheet 504 is formed on the first prism sheet 503. The first and second prism sheets 503 and 504 may enhance the linearity of light passing through the first and second prism sheets 503 and 504.

The liquid crystal panel 20 is disposed on the optical sheets 500. In addition, the liquid crystal panel 20 is disposed on the panel guide 23. The liquid crystal panel 20 is guided by the panel guide 23.

The liquid crystal panel 20 displays images by adjusting intensity of light passing through the liquid crystal panel 20. In detail, the liquid crystal panel 20 is a display panel for displaying the images by using the light emitted from the backlight unit 10. The liquid crystal panel 20 includes a TFT substrate 21, a color filter substrate 22 and a liquid crystal layer interposed between the two substrates. In addition, the liquid crystal panel 20 includes polarizing filters.

Although it is not shown in the drawings in detail, the TFT substrate 21 includes a plurality of gate lines crossing a plurality of data lines to form pixels and a thin film transistor (TFT) is provided at each cross section such that the thin film transistor can be connected to a pixel electrode of the pixel in one-to-one correspondence. The color filter substrate 22 includes color filters having R, G and B colors corresponding to the pixels, a black matrix covering the gate lines, data lines and thin film transistors within the limit of the color filters, and a common electrode covering the above elements.

A driving PCB 25 is provided at an outer peripheral portion of the LCD panel 210 to supply driving signals to the gate lines and data lines.

The driving PCB 25 is electrically connected to the liquid crystal panel 20 by a COF (chip on film) 24. The COF 24 may be replaced with a TCP (tape carrier package).

As described above, since the wavelength conversion sheet 501 includes the capping part 560, the wavelength conversion layer 530 can be effectively protected. The capping part 560 can effectively protect the wavelength conversion particles 531 from external moisture and/or oxygen.

Thus, the wavelength conversion sheet 501 may have improved reliability and durability, and the LCD according to the embodiment may have improved performance and image quality.

Figure 11:
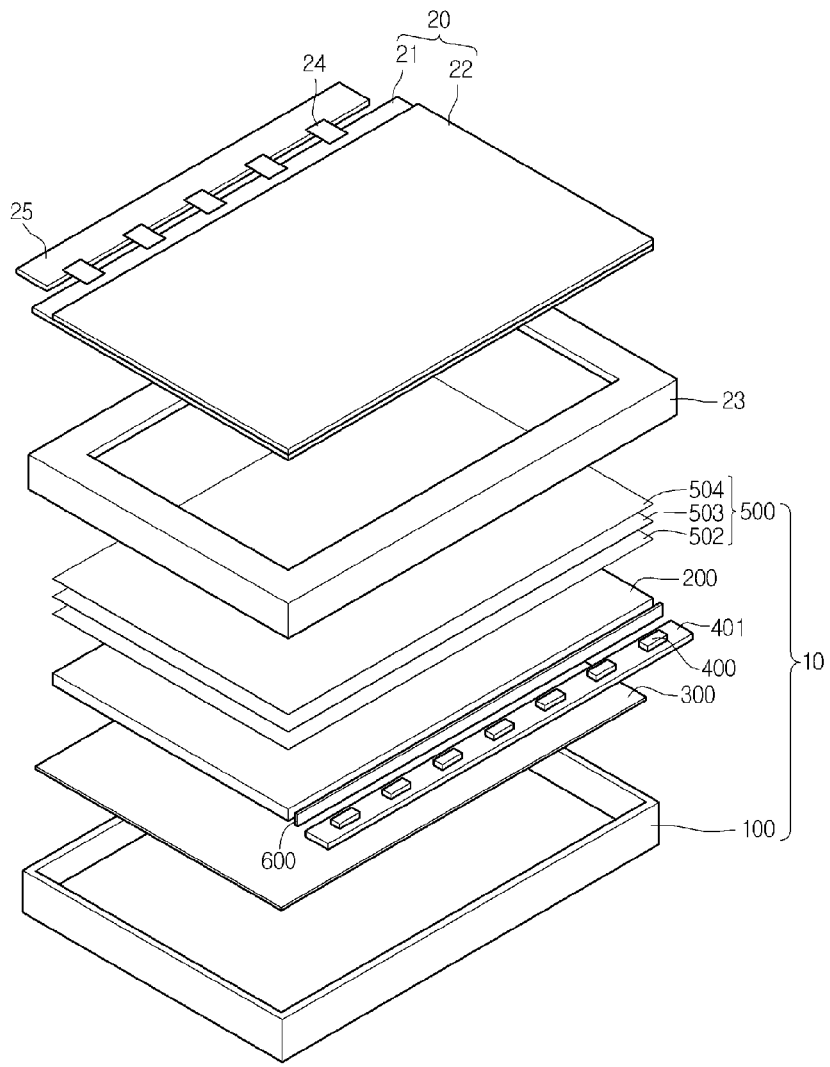
FIG. 11 is an exploded perspective view showing an LCD according to the second embodiment.
Figure 12:
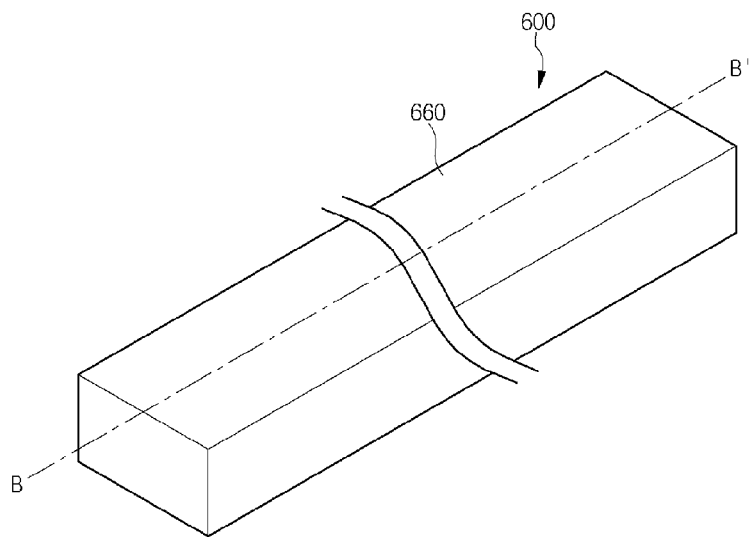
FIG. 12 is a perspective view of a wavelength conversion member according to the second embodiment.
Figure 13:
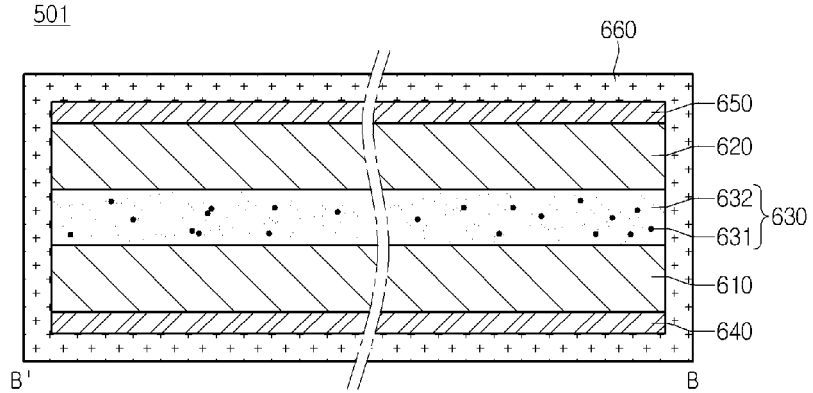
FIG. 13 is a sectional view taken along line B-B' of FIG. 12.
Figure 14:
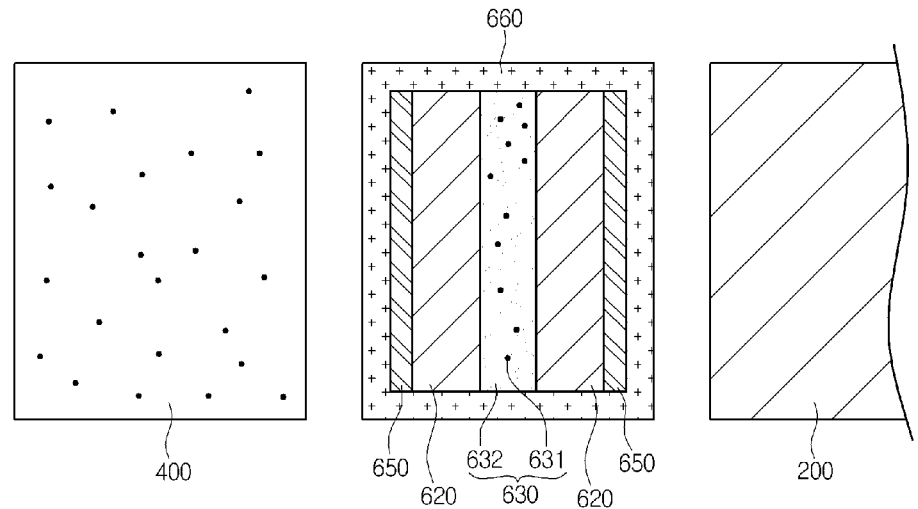
FIG. 14 is a sectional view showing a light guide plate, a light emitting diode, and a wavelength conversion member.

FIG. 11 is an exploded perspective view showing an LCD according to the second embodiment, FIG. 12 is a perspective view of a wavelength conversion member according to the second embodiment, FIG. 13 is a sectional view taken along line B-B' of FIG. 12, and FIG. 14 is a sectional view showing a light guide plate, a light emitting diode, and a wavelength conversion member. The description of the previous embodiment will be incorporated in the description of the present embodiment by reference. That is, the description about the LCD according to the previous embodiment will be incorporated in the description about the LCD according to the present embodiment.

Referring to FIGS. 11 to 14, the LCD according to the present embodiment includes a wavelength conversion member 600 instead of the wavelength conversion sheet 501. The wavelength conversion member 600 is interposed between the light emitting diodes 400 and the light guide plate 200.

The wavelength conversion member 600 extends in one direction. In detail, the wavelength conversion member 600 extends along one lateral side of the light guide plate 200. In more detail, the wavelength conversion member 600 may have a shape extending along an incident surface of the light guide plate 200.

The wavelength conversion member 600 receives the light emitted from the light emitting diodes 400 to convert the wavelength of the light. For instance, the wavelength conversion member 600 converts the blue light emitted from the light emitting diodes 400 into the green light and the red light. In detail, the wavelength conversion member 600 converts a part of the blue light into the green light having the wavelength in the range of about 520 nm to about 560 nm, and a part of the blue light into the red light having the wavelength in the range of about 630 nm to about 660 nm.

In addition, the wavelength conversion member 600 can convert the UV light emitted from the light emitting diodes 400 into the blue light, the green light and the red light. In detail, the wavelength conversion member 600 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion member 600 and the lights converted by the wavelength conversion member 600. In detail, the white light can be incident into the light guide plate 200 through the combination of the blue light, the green light and the red right.

As shown in FIGS. 12 to 14, the wavelength conversion member 600 includes a lower substrate 610, an upper substrate 620, a wavelength conversion layer 630, a first inorganic protective layer 640, a second inorganic protective layer 650, and a capping part 660.

As shown in FIG. 13, the lower substrate 610 is disposed under the wavelength conversion layer 630. The lower substrate 610 is transparent and flexible. The lower substrate 610 closely adheres to the bottom surface of the wavelength conversion layer 630.

In addition, as shown in FIG. 14, the lower substrate 610 is opposite to the light emitting diodes 400. In detail, the lower substrate 610 is disposed between the light emitting diodes 400 and the wavelength conversion layer 630.

As shown in FIG. 13, the upper substrate 620 is disposed on the wavelength conversion layer 630. The upper substrate 620 is transparent and flexible. The upper substrate 620 closely adheres to the top surface of the wavelength conversion layer 630.

In addition, as shown in FIG. 14, the upper substrate 620 is opposite to the light guide plate 200. In detail, the upper substrate 620 is disposed between the light guide plate 200 and the wavelength conversion layer 630.

The wavelength conversion layer 630 is interposed between the lower substrate 610 and the upper substrate 620. The wavelength conversion layer 630 is sandwiched between the upper and lower substrates 620 and 610. The wavelength conversion layer 630 has the feature substantially equal to the feature of the wavelength conversion layer 530 according to the previous embodiment.

The first inorganic protective layer 640 is disposed below the wavelength conversion layer 630. In detail, the first inorganic protective layer 640 is disposed under the lower substrate 610. In more detail, the first inorganic protective layer 640 is coated on the bottom surface of the lower substrate 610.

The second inorganic protective layer 650 is disposed on the wavelength conversion layer 630. In detail, the second inorganic protective layer 650 is disposed on the upper substrate 620. In more detail, the second inorganic protective layer 650 is coated on the top surface of the upper substrate 620.

The capping part 660 is disposed at lateral sides of the wavelength conversion layer 630. The capping part 660 covers the lateral sides of the wavelength conversion layer 630. The capping part 660 may cover the whole lateral sides of the wavelength conversion layer 630. The capping part 660 may directly make contact with the lateral sides of the wavelength conversion layer 630.

The capping part 660 covers the lateral sides of the lower substrate 610, the upper substrate 620, the first inorganic protective layer 640, and the second inorganic protective layer 650. In detail, the capping part 660 directly makes contact with the lateral sides of the lower substrate 610, the upper substrate 620, the first inorganic protective layer 640, and the second inorganic protective layer 650.

The capping part 660 covers the top surface and the bottom surface of the wavelength conversion layer 630. In detail, the capping part 660 covers the bottom surface of the first inorganic protective layer 640 and the top surface of the second inorganic protective layer 650. In more detail, the capping part 660 may be directly coated on the bottom surface of the first inorganic protective layer 640 and the top surface of the second inorganic protective layer 650.

As a result, the capping part 660 is coated on the whole outer surface of the stack structure including the wavelength conversion layer 630, the lower substrate 610, the upper substrate 620, the first inorganic protective layer 640 and the second inorganic protective layer 650.

The capping part 660 includes an organic substance and an inorganic substance. For instance, the capping part 660 can be prepared as a single layer including the organic substance and the inorganic substance.

The capping part 660 may include the mixture of the organic substance and the inorganic substance. For instance, the capping part 660 mainly includes an organic substance and the inorganic substance is uniformly distributed or doped in the organic substance.

The capping part 660 is substantially identical to the capping part 560 of the previous embodiment.

In addition, the layer structure of the wavelength conversion member 600 can be variously modified as shown in FIGS. 7 to 10.

In the LCD according to the present embodiment, the wavelength conversion layer 630 has a relatively small size. Thus, a smaller amount of wavelength conversion particles 631 can be used when manufacturing the LCD according to the present embodiment.

Therefore, the LCD according to the present embodiment can reduce the usage of the wavelength conversion particles 631 and can be manufactured at the low cost.

Figure 15:
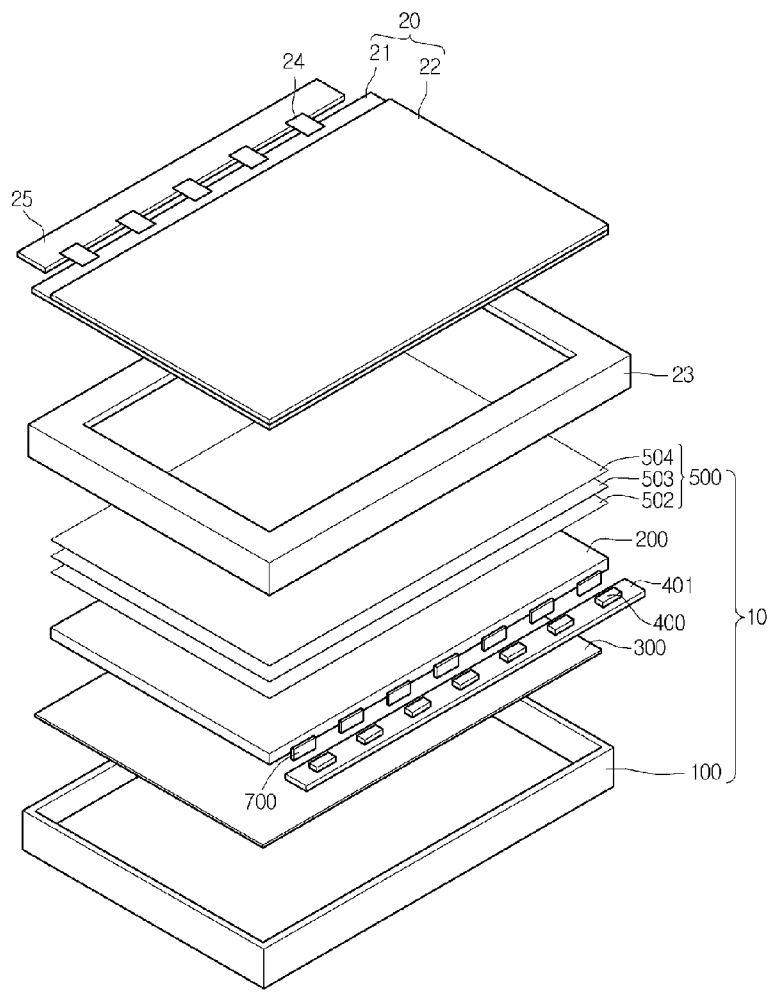
FIG. 15 is an exploded perspective view showing an LCD according to the third embodiment.
Figure 16:
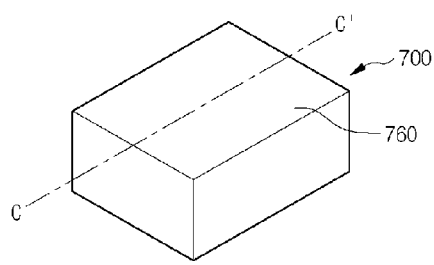
FIG. 16 is a perspective view of a wavelength conversion member according to the third embodiment.
Figure 17:
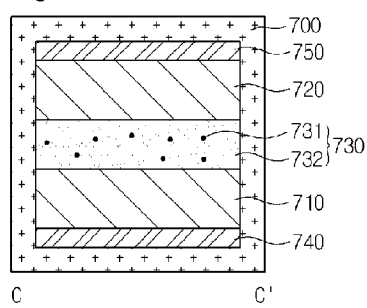
FIG. 17 is a sectional view taken along line C-C' of FIG. 14.
Figure 18:
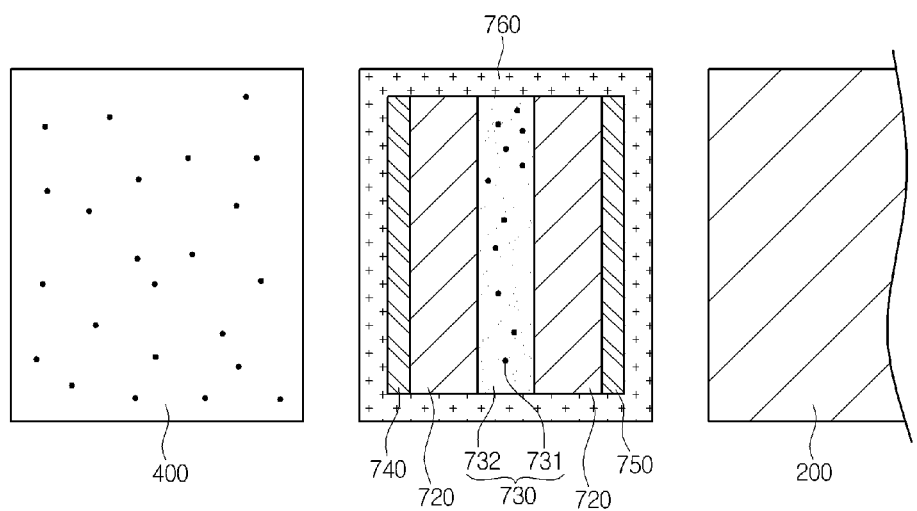
FIG. 18 is a sectional view showing a light guide plate, a light emitting diode, and a wavelength conversion member.

FIG. 15 is an exploded perspective view showing an LCD according to the third embodiment, FIG. 16 is a perspective view of a wavelength conversion member according to the third embodiment, FIG. 17 is a sectional view taken along line C-C' of FIG. 14, and FIG. 18 is a sectional view showing a light guide plate, a light emitting diode, and a wavelength conversion member. The description of the previous embodiment will be incorporated in the description of the present embodiment by reference. That is, the description about the LCD according to the previous embodiment will be incorporated in the description about the LCD according to the present embodiment.

Referring to FIGS. 15 to 18, the LCD according to the present embodiment includes a plurality of wavelength conversion members 700. The wavelength conversion members 700 correspond to the light emitting diodes 400, respectively.

In addition, the wavelength conversion members 700 are disposed between the light emitting diodes 400 and the light guide plate 200. In detail, each wavelength conversion member 700 is disposed between the corresponding light emitting diode 400 and the light guide plate 200.

The wavelength conversion members 700 convert the wavelength of the light emitted from the corresponding light emitting diode 400. The wavelength conversion members 700 are divided into first wavelength conversion members for converting the light emitted from the light emitting diodes 400 into the light having a first wavelength, such as the green light, and second wavelength conversion members for converting the light into the light having a second wavelength, such as the red light.

The wavelength conversion members 700 have a surface area larger than a surface area of the light emitting diodes 400. Thus, most of the light emitted from the light emitting diodes 400 can be incident into the corresponding wavelength conversion member 700.

In addition, as shown in FIGS. 16 to 18, the wavelength conversion member 700 includes a lower substrate 710, an upper substrate 720, a wavelength conversion layer 730, a first inorganic protective layer 740, a second inorganic protective layer 750 and a capping part 760.

The features of the lower substrate 710, the upper substrate 720, the wavelength conversion layer 730, the first inorganic protective layer 740, the second inorganic protective layer 750 and the capping part 760 are substantially identical to the features described in the previous embodiments.

In the LCD according to the present embodiment, the wavelength conversion layer 730 has a relatively small size. Thus, a smaller amount of wavelength conversion particles 731 can be used when manufacturing the LCD according to the present embodiment.

Therefore, the LCD according to the present embodiment can reduce the usage of the wavelength conversion particles 731 and can be manufactured at the low cost.

In addition, the features of each wavelength conversion member 700 can be modified suitably for the corresponding light emitting diode. Thus, the LCD according to the embodiments may have the improved brightness and uniform color reproduction characteristic.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The display device according to the embodiments can be used in the display field.

The invention claimed is:

1. An optical member comprising:
a lower substrate;
a wavelength conversion layer on the lower substrate;
an upper substrate on the wavelength conversion layer;
a first protective layer on the lower substrate;
a second protective layer on the upper substrate;
a first capping layer on the first protective layer; and
a second capping layer on the second protective layer,
wherein the wavelength conversion layer comprises a host and wavelength conversion particles in the host, and
wherein at least one of the first protective layer, the second protective layer, the first capping layer and the second capping layer include at least one of an inorganic material and an organic material.

2. The optical member of claim 1, wherein at least one of the first capping layer and the second capping layer includes one selected from the group consisting of silicon oxide, silicon nitride, silicon oxide nitride, silicon oxide carbide, aluminum oxide and niobium oxide.

3. The optical member of claim 1, wherein at least one of the first capping layer and the second capping layer includes a mixture obtained by mixing an inorganic substance with an organic substance.

4. The optical member of claim 1, wherein at least one of the first capping layer and the second capping layer includes an organic-inorganic composite.

5. The optical member of claim 1, wherein at least one of the first capping layer and the second capping layer includes parylene resin.

6. The optical member of claim 1, wherein the wavelength conversion particles include quantum dots.

7. The optical member of claim 1, wherein the first protective layer and the second protective include inorganic material, and
wherein the first capping layer and the second capping layer include inorganic material and organic material.

8. The optical member of claim 1, wherein the first protective layer is on a bottom surface of the lower substrate.

9. The optical member of claim 1, wherein first capping layer is on a bottom surface of the lower substrate, and
wherein the first protective layer is between the lower substrate and the first capping layer.

10. The optical member of claim 1, further comprising a side capping layer extending between the first capping layer and the second capping layer, the side capping layer on side edges of the upper substrate and the lower substrate.

11. A display device comprising:
a light source; and
an optical member,
wherein the optical member comprises:
a lower substrate;
a wavelength conversion layer on the lower substrate;
an upper substrate on the wavelength conversion layer;
a first protective layer on the lower substrate;
a second protective layer on the upper substrate;
a first capping layer on the first protective layer; and
a second capping layer on the second protective layer,
wherein the wavelength conversion layer comprises a host and wavelength conversion particles in the host, and
wherein at least one of the first protective layer, the second protective layer, the first capping layer and the second capping layer include at least one of an inorganic material and an organic material.

12. The display device of claim 11, wherein at least one of the first capping layer and the second capping layer includes one selected from the group consisting of silicon oxide, silicon nitride, silicon oxide nitride, silicon oxide carbide, aluminum oxide and niobium oxide.

13. The display device of claim 11, wherein at least one of the first capping layer and the second capping layer includes a mixture obtained by mixing an inorganic substance with an organic substance.

14. The display device of claim 11, wherein at least one of the first capping layer and the second capping layer includes an organic-inorganic composite.

15. The display device of claim 11, wherein at least one of the first capping layer and the second capping layer includes parylene resin.

16. The display device of claim 11, wherein the wavelength conversion particles include quantum dots.

17. The display device of claim 11, wherein the first protective layer and the second protective include inorganic material, and
wherein the first capping layer and the second capping layer include inorganic material and organic material.

18. The display device of claim 11, wherein the first protective layer is on a bottom surface of the lower substrate.

19. The display device of claim 11, wherein first capping layer is on a bottom surface of the lower substrate, and wherein the first protective layer is between the lower substrate and the first capping layer.

20. The display device of claim 11, further comprising a side capping layer extending between the first capping layer and the second capping layer, the side capping layer on side edges of the upper substrate and the lower substrate.

* * * * *